Feb. 28, 1967   EIICHI HASEGAWA ETAL   3,306,082
WASHING MACHINES

Filed Dec. 14, 1964   8 Sheets-Sheet 1

INVENTORS
Eiichi Hasegawa
Ryoichiro Oshima

By Paul M. Craig, Jr.

ATTORNEY

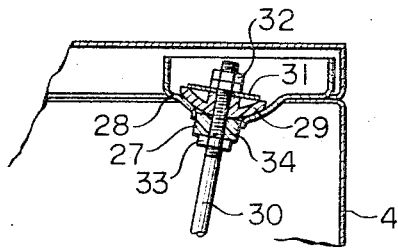
FIG. 2
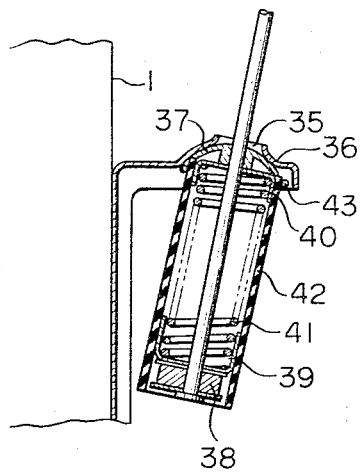
FIG. 4
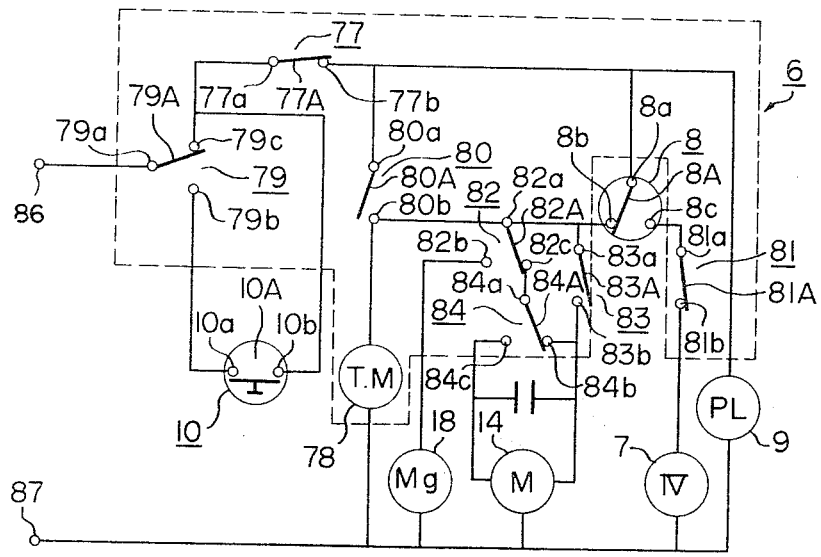

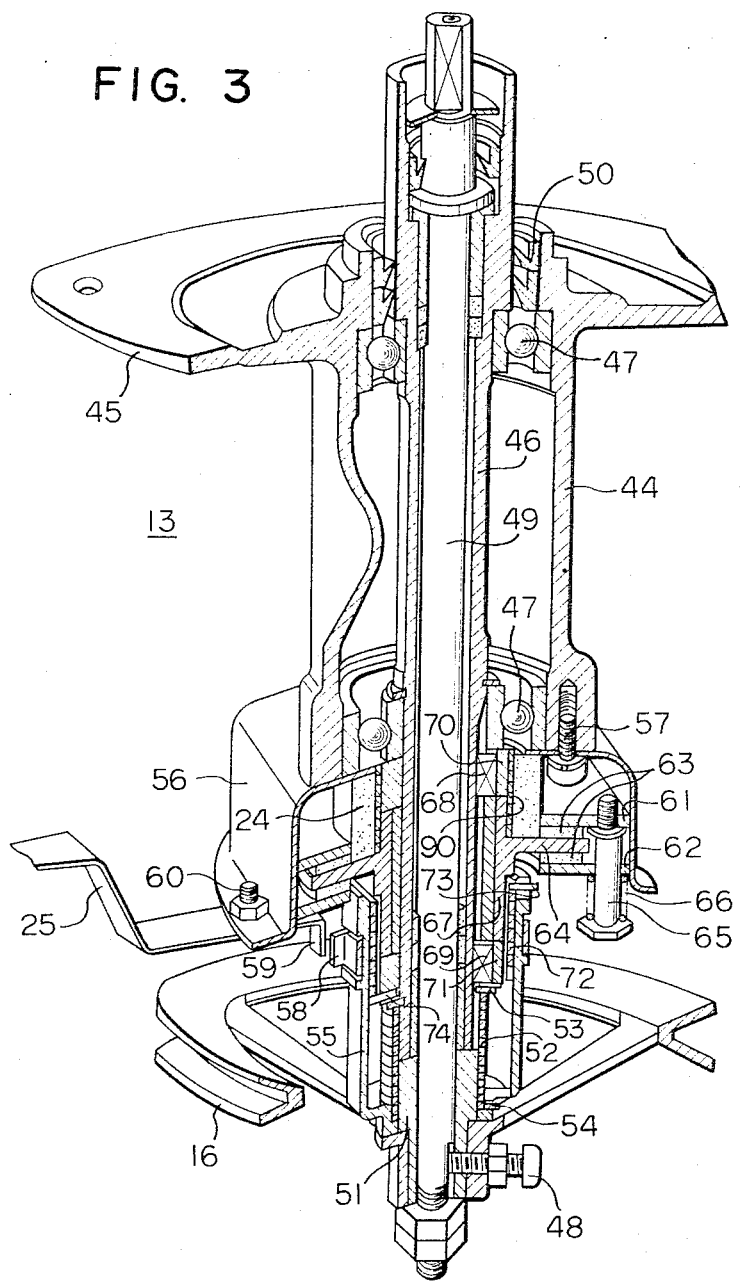

INVENTORS
Eiichi Hasegawa
Ryochiro Oshima

By Paul M. Craig, Jr.
ATTORNEY

United States Patent Office 3,306,082
Patented Feb. 28, 1967

3,306,082
WASHING MACHINES
Eiichi Hasegawa and Ryoichiro Oshima, Hitachi-shi, Japan, assignors to Hitachi, Ltd., Tokyo, Japan, a corporation of Japan
Filed Dec. 14, 1964, Ser. No. 417,966
20 Claims. (Cl. 68—12)

This invention relates to electrical washing machines, and more particularly to those in which washing and centrifugal hydro extraction are effected in one and the same vertical basket or upstanding rotary basket.

In known washing machines of the above kind, reciprocating agitators are employed as washing means, in order to prevent the wash from being damaged and to effect washing all around the wash during washing operation, and also to make the basket vibrating as little as possible during dehydrating operation, by rendering the rinsed wash not to be distributed in remarkably unbalanced conditions within the basket.

In such a washing machine, however, a complicated mechanism is required to provide for more power change from the electric motor rotating in one direction at a high speed to the agitator reciprocating at a low speed. As a result, the over-all construction of the washing machine is complicated and increased in weight, resulting in a high cost.

In place of the agitator, an impeller has been proposed as simple washing means, which receives power direct from the motor and is rotated in one direction at a high speed. It is characterized by its simple construction, but in order to take advantage of its simple construction, the impeller should be disposed within the basket in concentric relation therewith. With such an arrangement, however, the water current produced by the impeller during washing is a simple eddy not including up-and-down movement of water. As a result, the wash is caused to circulate along with the horizontal eddy current of water, so that the lower portion only of the wash may be rubbed and rinsed by the impeller. Such a washing machine is, therefore, of low washing efficiency.

In addition, since the impeller as above-mentioned is rotated in one direction at a high speed, the wash is subjected to a suction towards the centre and then thrown out after having been twisted to a large extent. This renders the wash entangling together within the basket, and the wash is thereby prevented from effective flow movement in the basket. Moreover, when water is being drained after washing, the wash is caused to locate within the basket in a remarkably unbalanced condition by virtue of the mutual entangling. If the basket is then rotated for centrifugal extraction, as it stands, the unbalance of the wash causes the basket to vibrate laterally to a large extent, effecting head-shaking motion, resulting in dangerous strikes of the basket on various machine elements within the framework. The washing machine might be caused to jump as a whole in an extreme case. In order to prevent this, the wash should manually be rearranged for distributing the same as evenly as possible within the basket. It has been impossible in such a washing machine to effect transfer to the centrifugal extracting operation automatically after washing and rinsing.

An object of the present invention is to provide a washing machine of simple construction, in which satisfactory washing is effected by an impeller rotating in one direction at a high speed within a basket vertically disposed in a water tank during the washing operation, while, during the centrifugal extraction, the basket is connected with the impeller to rotate at a high speed for effecting centrifugal extraction with least vibration.

Another object of the present invention is to provide a washing machine in which a properly shaped basket causes to occur up-and-down movement of the water current produced within the basket by an impeller rotating in one direction at a high speed, so that all the wash may effectively be rubbed and washed by the impeller, with the water current circulating smoothly without striking the basket violently for preventing the wash from damage, and at the same time, the wash does not locate in the basket, after draining of water therefrom, in extremely unbalanced condition, thus preventing the basket from vibrating violently during the centrifugal extraction.

Another object of the present invention is to provide a washing machine in which an appropriate amount of water is retained in the basket when transferring to the centrifugal extraction, thereby avoiding extremely unbalanced disposition of the wash in the basket, and weakening the basket vibration at the resonant point in the initial period of the basket rotation, whereby the transfer from washing to centrifugal extractions may smoothly be effected without need of manual help.

A further object of the present invention is to provide a washing machine in which a water tank accommodating therein a basket, which tends to vibrate during the centrifugal extraction due to unbalance, is supported resiliently with respect to the framework, and any up-and-down oscillation, lateral vibration, head shaking, and all other oscillation energy in every direction is dissipated as frictional heat loss, as far as possible, by a simple structure, without transmitting the water-tank vibration strongly to the framework for limiting the vibration of water tank, whereby, even if the wash should be disposed within the basket in an extremely unbalanced state, the basket would be rotated safely for centrifugal extraction without need of manual re-arrangement of the wash in the basket.

A further object of the present invention is to provide a washing machine in which an impeller rotating in one direction at a high speed is caused to rotate in the opposite direction periodically for untwining the wash at the times of reverse rotations to prevent entangling of the wash, by provision of a simple and strong clutch mechanism steady in operation.

A still further object of the present invention is to provide a washing machine of simple construction and comprising simple electrical control circuits, whereby an impeller rotating within a basket in one direction at a high speed during washing and rinsing operation is periodically caused to rotate in the opposite direction, while the impeller and the basket are rotated in unison in one direction at a high speed continuously during centrifugal extraction, and whereby a braking force is applied to the basket at the finish of centrifugal extraction to stop the basket promptly, and a drain valve is opened at the end of rinsing operation and at the time of draining.

There are other object and particularities of the present invention, which will be made obvious from the following detailed description of the invention, with reference to the accompanying drawings, in which:

FIG. 2 is an enlarged vertical sectional view showing vibration-proof support for the water tank in the framework of the washing machine;

FIG. 3 is a perspective view in vertical cross-section of the clutch mechanism for pulsator and basket of the washing machine;

FIG. 4 is an electrical circuit diagram for controlling the washing machine, the circuit being shown in the state of washing operation;

Figure 6:
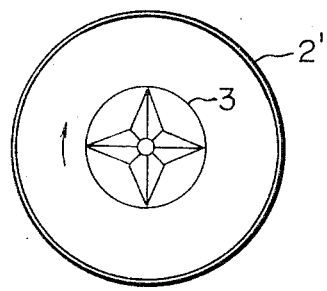
FIG. 6 is a somewhat diagrammatic plan view of a basket of simple cylindrical form with an impeller disposed at the bottom centre for rotating in one direction at a high speed.
Figure 7:
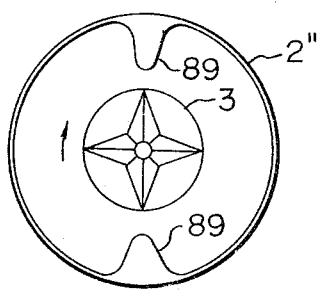
FIG. 7 is a similar view of the basket and impeller, the basket being modified to have inwardly projecting obstructing plates provided on the inner wall of the basket in opposition.
Figure 8:
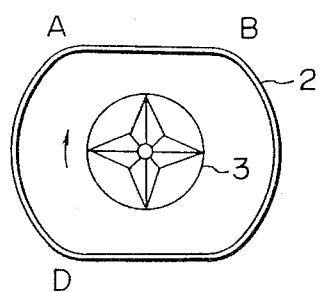
FIG. 8 is a similar view of the basket and impeller embodying the present invention, the basket being of substantially ellipsoidal cross-section.
Figure 9:
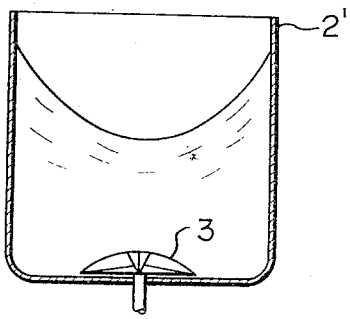
Figure 10:
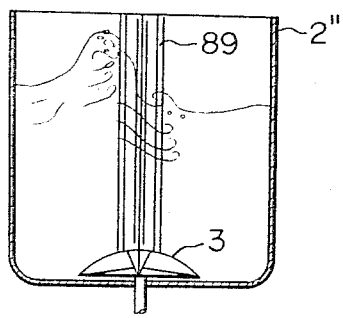
Figure 11:
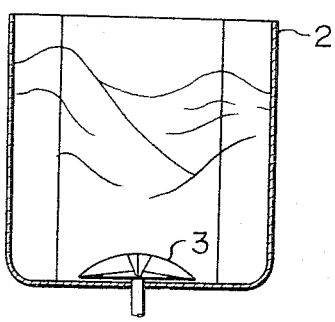
Figure 12:
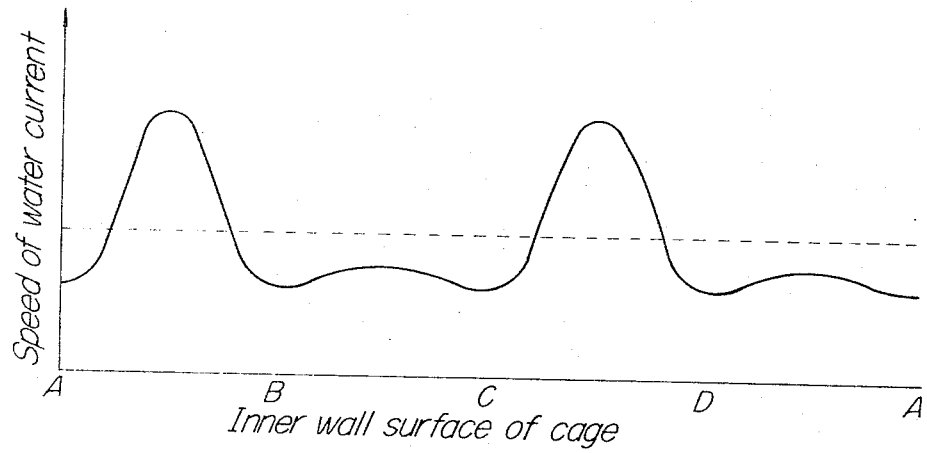
Figure 13:
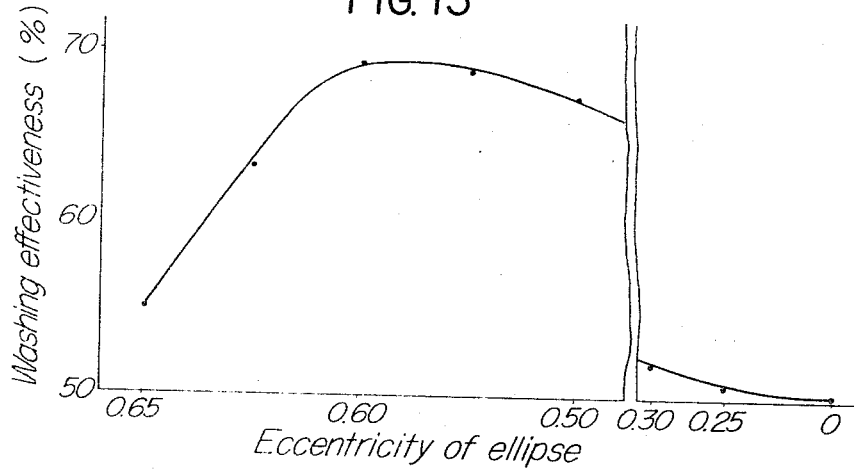
Figure 14:
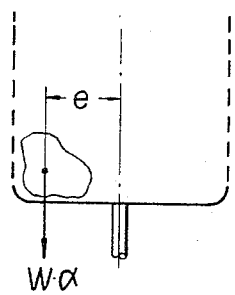
Figure 15:
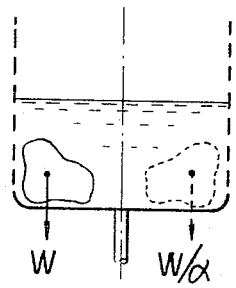
Figure 16:
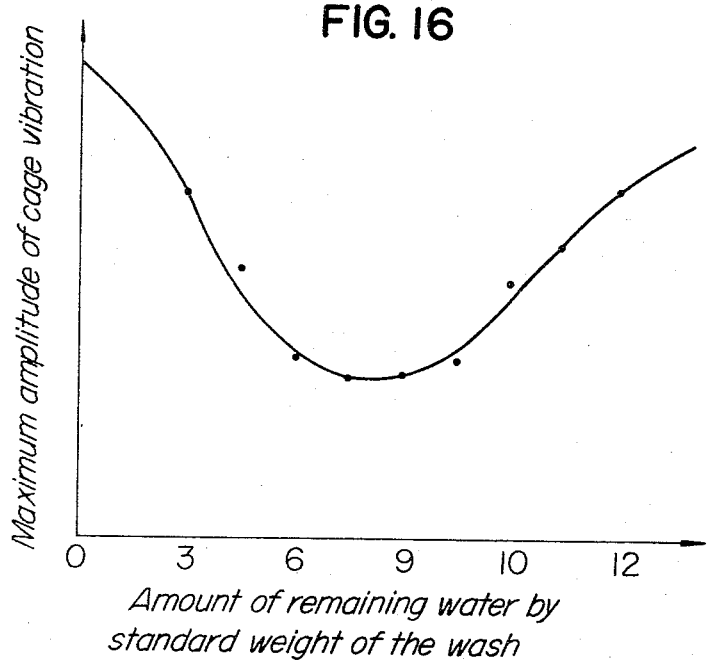
Figure 17:
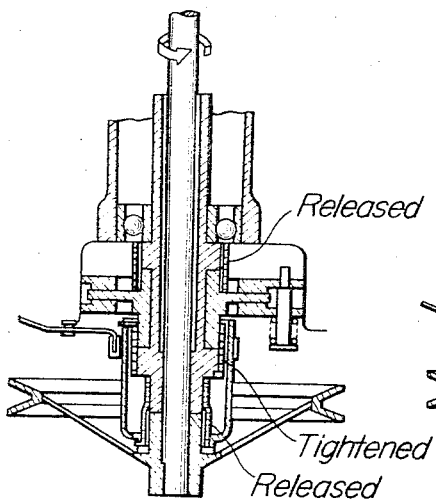
Figure 19:
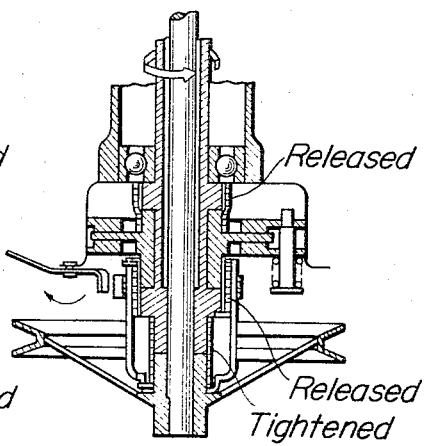
Figure 18:
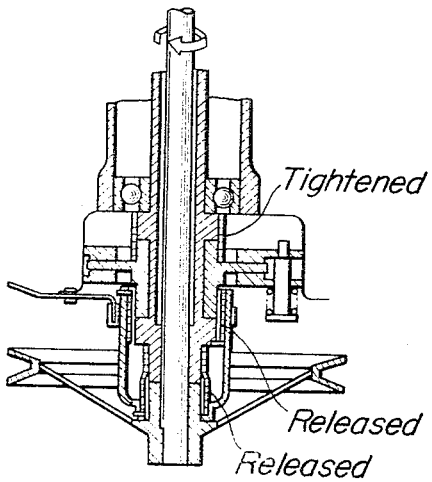
Figure 20:
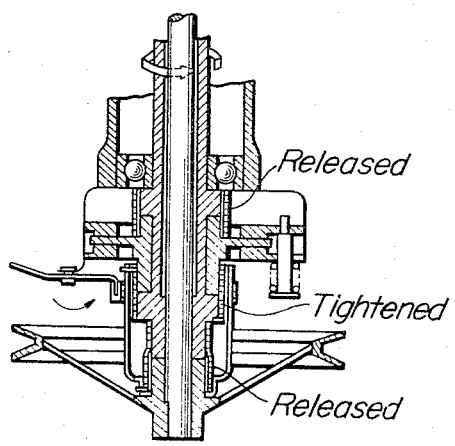

FIGS. 9 to 11, inclusive, are vertical sectional views of the baskets shown in FIGS. 6 to 8, respectively, showing the manners of washing effected in the respective baskets;

FIG. 12 is a curve diagram showing the speed distribution of water current along the inner wall surface of the ellipsoidal cylinder basket shown in FIG. 8;

FIG. 13 is a curve diagram showing the relation between the washing effectiveness and the eccentricity of ellipse, as determined by experimental washing by use of the ellipsoidal cylinder basket shown in FIG. 11;

FIG. 14 shows somewhat diagrammatically the manner of unbalanced location of the wash when the basket is drained completely;

FIG. 15 shows somewhat diagrammatically the manner of balanced distribution of the wash obtained when some water is retained in the basket;

FIG. 16 is a curve diagram showing the relation between the amount of remaining water per standard amount of the wash and the maximum amplitude of vibration of the basket; and FIGS. 17 to 20, inclusive, show the modes of operation of the clutch mechanism shown in FIG. 3; FIG. 17 showing the clutch in the state for rotating the impeller in the counter-clockwise direction during the washing and rinsing operation; FIG. 18 showing the clutch in the state for rotating the impeller in the clockwise direction during the washing and rinsing operation; FIG. 19 showing the clutch in the state for rotating the basket and impeller in unison in the counter-clockwise direction during the centrifugal extraction; and FIG. 20 showing the clutch in the state it assumes after the finish of extraction, when the basket and impeller have been disconnected from each other and a braking force has been applied to the basket; and these figures, the righthand-up hatching lines show that the parts are at standstill, while the lefthand-up hatching lines show that the parts are rotating.

Figure 1:
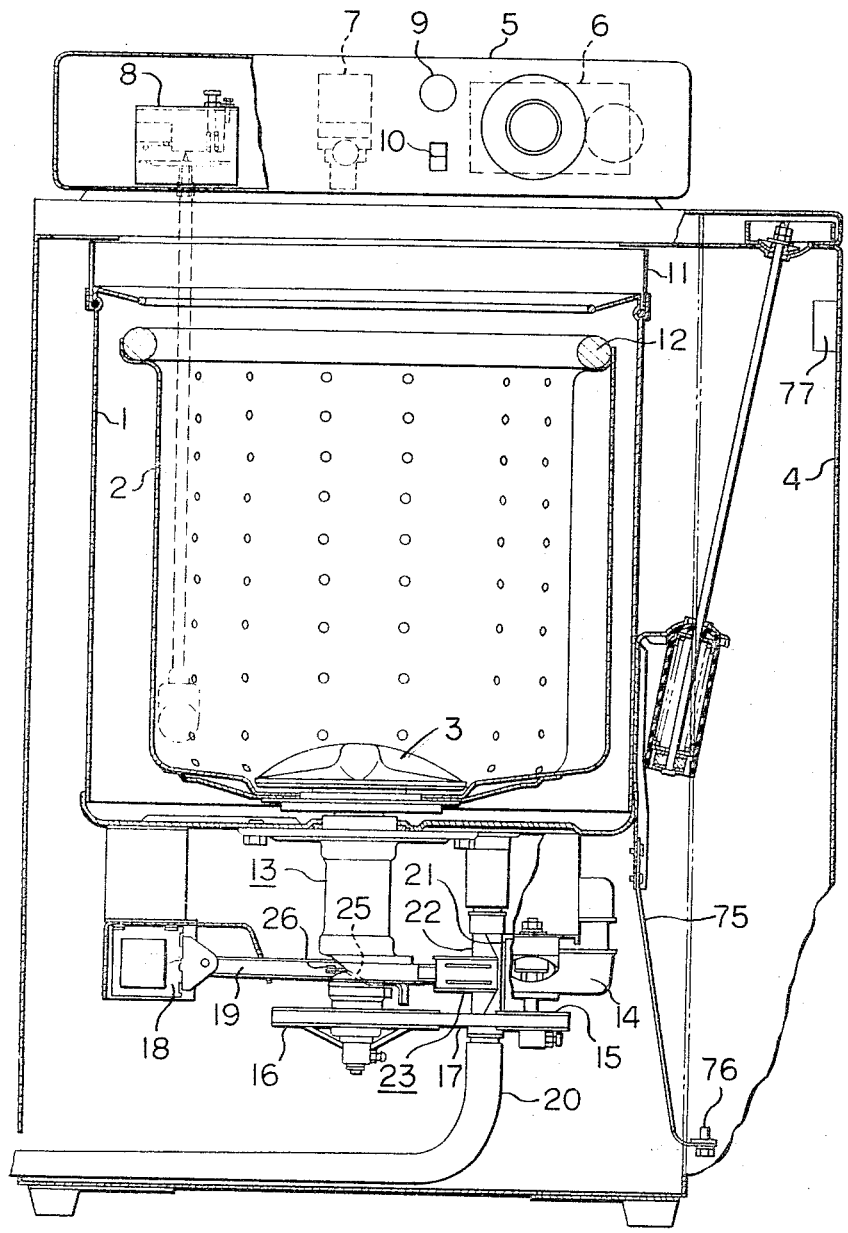
FIG. 1 is a vertical sectional view of a washing machine embodying the invention.
Figure 5:
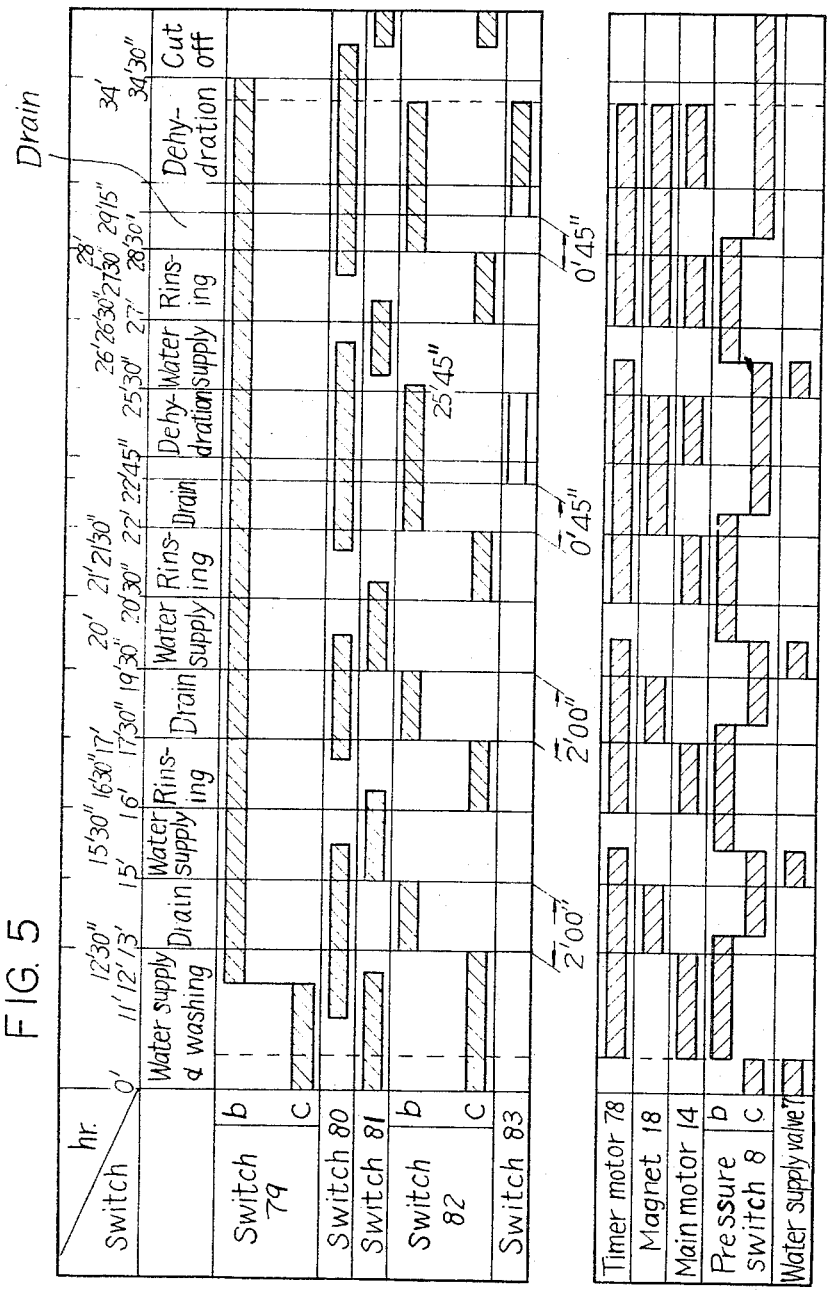
FIG. 5 is a time-sequence diagram of the automatic operation cycle of the machine.

Referring now to FIG. 1 of the drawings, the washing machine comprises a vertical water tank 1 having a top opening for receiving water, a substantially ellipsoidal cylinder basket 2 rotatably mounted within the water tank, an impeller 3 mounted rotatably within the basket 2, the direction of rotation of the pulsator being periodically reversed, driving mechanisms, and a framework 4 covering all the above-mentioned elements and supporting the water tank 1 in vibration-proof manner.

Within the water tank 1 is rotatably mounted the basket 2, provided at its top end with an inertia ring 12 for raising the centre of gravity of the basket, and the impeller 3 is disposed at the bottom centre of basket 2. The basket 2 and impeller 3 are supported by a clutch 13 attached to the bottom wall of water tank 1, the basket and impeller being connected together and disconnected from each other by the clutch 13. An electric motor 14 mounted on a suitable stationary part of the machine has a pulley 15 which is connected by a belt 17 to a pulley 16 mounted fixed on the rotating shaft of the pulsator 3 below the clutch 13. An electromagnet 18 is attached to the bottom wall of water tank 1, and is provided with an operating rod 19 which is attracted by the magnet 18 when energized. The water in water tank 1 can be drained through a drain port in the bottom of water tank 1 by way of a drain pipe 20 which opens outside the framework 4. The drain pipe 20 is partly formed by a flexible rubber member 22 attached at the side face to a supporter plate 21. The rubber member 22 is pressed against the supporter plate 21 by the end of operating rod 19 of electromagnet 18, and when the operating rod 19 is attracted by the energized electromagnet 18, the rubber member 22 is opened, thus providing a drain valve 23. The operating rod 19 is also operatively connected to the end 26 of lever 25 at the middle portion for operating the clutch 13. The lever 25 is rotated along with the axial movement of operating rod 19.

A control box 5 is mounted on the top of framework 4, and comprises a timer mechanism 6, a water supply valve 7, a pressure switch 8, a pilot lamp 9, and an automatic-nonautomatic change-over switch 10. On the top of water tank 1, a ring-like water-proof auxiliary wall member 11 made of rubber is provided in close contact with the tank wall, and permits entrance of the wash into the basket 2. The rubber member 11 thus protects the driving mechanism in the lower portion of the framework 4 against water leakage.

Referring to FIG. 2, the framework 4 is provided at its upper corner with an upward semi-spherical washer 28 having a central hole 27 and a semi-spherical nylon piece 29 mounted on the washer 28 for frictional sliding engagement therewith when the water tank 1 vibrates laterally. A suspension rod 30 passes through the central hole 27 of washer 28 as well as the nylon piece 29, and is fixed therewith by means of nuts 32 through a washer 31 and a lower nut 33 through a rubber ring 34 in the hole 27. At the same level with the centre of gravity of vibrating structure, a downward semi-spherical washer 36 having a central hole 35 is mounted on the outside wall of water tank 1, and a nylon piece 37 of semi-spherical shape is provided for frictional sliding engagement with the washer 36 when the water tank 1 vibrates laterally. The suspension rod 30 passes through the central hole 35 of washer 36 and the nylon piece 37, and extends downwardly, the lower end of rod 30 carrying a rubber ring 38 and a cup-like slider 39. A coil spring 41 is provided between the slider 39 and a washer 40 below the nylon piece 37, and acts to press the nylon piece 37 against the semi-spherical washer 36, and the upper nylon piece 29 against the semi-spherical washer 28, in accordance with the weight of water tank 1. Thus, the oscillation energy during the lateral vibration of water tank 1 is dissipated as increased frictional heat. A rubber pipe 42 is fixed by a clip 43 to the washer 40, and the side wall of the slider 39 loosely contacts the inner wall surface of the pipe 42. When the water tank 1 should move to jump, the rubber pipe 42 would move up and down, and frictional heat would be liberated between the slider 39 and the rubber pipe for dissipation. As shown in FIG. 1, the lower semi-spherical washer 36 is extended downwardly to form a leg 75 which may be fixed to the framework 4 by means of a bolt 76 during transport of the machine for keeping the water tank 1 immovable.

Referring to FIG. 3, the clutch mechanism comprises a bearing sleeve 44 with its upper end flange 45 fixed to the bottom wall of tank 1. A hollow shaft 46 is secured to the bottom wall of basket 2, and is supported by bearings 47 and 47' provided within the sleeve 44, and a water seal 50 seals the shaft. The impeller 3 is secured to the upper end of a rotating shaft 49, and the shaft 49 passes through the hollow shaft 46, the pulley 16 being fixed to the lower end of shaft 49 by means of a bolt 48 through a collar 51. A coil spring 52 wound in the counter-clockwise direction encircles the collar 51 and the lower end of the hollow shaft 46, the upper end 53 of spring 52 being fixed to the shaft 46, while the lower end 54 being secured to the lower end of a rotatable coil case 55. A cover 56 is fixed to the lower end of the stationary bearing sleeve 44 by bolts 57, and the lower end flange of the cover 56 rotatively carries the mid portion of clutch operating lever 25 by means of a bolt 60. The end 59 of lever 25 is bent as shown for enabling the same to engage an engagement piece 58 frictionally secured to the outer periphery of coil case 55. When the electromagnet 18 is in operation, the lever 25 is rotated counter-clockwisely, with its end 59 disengaged from the engagement piece 58 to liberate the coil case 55 as well as the coil spring 52, and when the collar 51 is rotated in the counter-clockwise direction, the twining force of coil spring 52 renders the collar 51 and hollow shaft 46 secured together. When the electromagnet 18 is not in operation, the lever end 59 engages the piece 58 to rotate the coil case 55 clockwisely, so that the lower end 54 of coil spring 52 is expanded to disengage the same from the collar 51 for disconnecting the latter from the hollow shaft 46.

A stationary disc 61 is secured to the cover 56, and cooperates with a disc 62 to apply a braking force to a rotating disc 64 through brake linings 63. A plurality of press bolts 64 are screwed into the disc 61, and a coil spring 66 is disposed between the lower heads of bolts 65 and the disc 62 for forcing the disc 62 towards the disc 61 to apply pressure to the brake linings 63 as well as to the rotating disc 64 for applying frictional braking force to the latter. The disc 64 has a sleeve portion 67 rotatable around the hollow shaft 46. Sleeves 70 and 71 are arranged over and below the sleeve 67, respectively, and fixed to the hollow shaft 46 by means of keys 68 and 69, respectively. A coil spring 72 wound in the counter-clockwise direction has its lower end 74 fixed to the sleeve 71, and its upper portion encircling the sleeve 67 with a gap formed therebetween, the upper end 73 of the spring being fixed to the coil case 55.

When the lever end 59 is not in engagement with the engagement piece 58, the coil case 55 releases the upper end 73 of coil spring 72, so that the upper portion of coil spring 72 does not contact the sleeve portion 67 of disc 64, and the sleeve portion 67 is not connected with the sleeve 71. When the lever end 59 engages the engagement piece 58 to rotate the coil case 55 clockwisely for expanding the coil spring 52 as hereinabove described, the upper end 73 of coil spring 72 is tightened up inwardly, and if the hollow shaft 46 and sleeve 71 are rotating counter-clockwisely, the coil spring 72 acts to connect the sleeves 67 and 71 together for rotating them in unison, whereby a braking force is applied to the disc 64 for stopping the rotation of hollow shaft 46.

The sleeves 67 and 70 are encircled by a coil spring 90, wound counter-clockwisely, which embraces the sleeves by its own spring force. When the hollow shaft 46 and sleeve 70 are going to rotate clockwisely, the coil spring 90, is tightened inwardly to fix the sleeves 67 and 70 together. Thus, a braking force is applied to the disc 64 for stopping the rotation of hollow shaft 46. As has been well understood, the coil spring 72 and 90, act in mutually opposite directions of rotation. Thus, when the lever end 59 is in engagement with the coil case engagement piece 58, the hollow shaft 46 is connected fixed to the sleeve 67 by coil springs 72 and 90, irrespective of whether the shaft 46 is rotating clockwisely or counterclockwisely, resulting in application of the brake. It is to be noted that coil springs 57, 72 and 90 are all wound in the same direction, in the counter-clockwise direction. The coil spring 90 is surrounded by an oil-impregnated felt ring 24, whereby frictional resistance is minimized between the surface of hollow shaft 46 and the inner face of coil spring 90, when the former is rotating in the counter-clockwise direction.

Referring now to FIG. 4, the main motor 14, electromagnet 18, water-supply electromagnetic valve 7, and pilot lamp 9, are under control of the pressure switch 8, automatic-nonautomatic change-over switch 10, and cam groups 79A, 80A, 81A, 82A, 83A and 84A driven by a timer motor 78, and a safety switch 77. The contact 79a of main switch 79 is connected to one supply terminal 86, and may be connected selectively to contact 79b or 79c by cam 79A. The automatic-nonautomatic switch 10 has a contact 10a connected to contact 79b, and a contact 10b connected to contact 79c, and contacts 10a and 10b may be connected together by a push button 10A. A contact 77a of safety switch 77 is connected to contact 79c, and the safety switch 77 comprises a movable piece 77A which normally connects contact 77a to contact 77b, but opens the switch when the water tank 1 vibrates too violently. To the contact 77b are connected parallel circuits of the pilot lamp 9, water supply valve 7, main motor 14, electromagnet 18, and timer motor 78, the other ends of these circuits being connected to the other supply terminal 87. The pilot lamp 9 is connected direct to contact 77b for showing that the washing machine is on for operation. The water supply valve 7 is connected to contact 8c of pressure switch 8 through switch 81, the contact 8c being connectable to contact 8a connected to contact 77b, by a movable piece 8A which engages contact 8c or 8b selectively. The movable piece 8A engages contact 8b when the water tank 1 becomes full of water to increase the water pressure at the tank bottom to a predetermined value, while otherwise it engages contact 8c. The timer motor 78 is connected to contact 80b of switch 80, which contact is connected to contact 8b, and may be connected to contact 77b through cam 80A and contact 80b. The contacts 80b and 8b are also connected to a contact 82a of switch 82, and contact 82a may be connected to contact 82b or 82c selectively by cam 82A. When contacts 82a and 82b are connected together, the electro-magnet 18 is energized, while, when contacts 82a and 82c are connected together, the main motor 14 is energized through a reversing cam switch 84. The cam switch 84 comprises a contact 84a direct connected to contact 82c, and contacts 84b and 84c between which a condensor connected in parallel with the motor 14 is connected. The switch 84 further comprises a cam 84A for connecting contact 84a to contact 84b or 84c selectively, and the cam 84A is so operated that contacts 84b and 84c are periodically changed over in connection to contact 84a. Thus, the direction of high-speed rotation of main motor 14 is periodically reversed. The contact 84b is further connected to a contact 83b of switch 83, which latter contact may be connected to contacts 8b and 80b through cam 83A and contact 83a, for rotating the motor 14 in one direction only at a high speed.

Prior to operation of the washing machine, the wash and washing agent are entered into the basket 2. When the automatic operation is intended to effect, the push button 10A is depressed and then the dial is rotated manually, whereupon the cam 79A closes on contact 79c, the cam 81A closes on contact 81b, and the cam 82A closes on contact 82c, thus completing the circuits for pilot lamp 9 and water supply valve 7. When water has been supplied into the water tank 1 to the predetermined level, the pressure switch 8 is operated by a diaphragm to transfer the movable piece 8A from contact 8c to contact 8b, whereupon the timer motor 78 is energized. The timer motor 78 drives cams 79A, 80A, 81A, 82A and 83A, and the main motor 14 is energized by way of 86–79–77–8a–8A–8b–82a–82A–82c–84. At this time, the electromagnet 18 is not energized, with its operating rod 19 pressing the rubber member 22 against the supporter plate 21, thus closing the drain valve 23. The lever 25 is then kept pressed, and its end 59 keeps contact with the engagement piece 58 of coil case 55, thus rotating the coil case 55 in the clockwise direction as shown in FIGS. 17 and 18. Then, the lower end 54 of coil spring 52 with the upper end 53 fixed is rotated clockwisely, the lower portion of spring 52 being thus expanded, with its inner side separated from the surface of collar 51 for disconnecting the collar 51 from the hollow shaft 46 of basket 2. Thus, the collar 51 does not transmit rotating torque to the basket 2 regardless of direction of rotation of collar 51. At the same time, the upper end 73 of coil spring 72 with its lower end 74 fixed to the hollow shaft 46 is rotated clockwisely to wind up the upper portion of coil spring 72 against the sleeve 67 of disc 64. When the rotating shaft 49 is rotated in the counter-clockwise direction through the pulley 16 receiving power from the motor 14 as shown in FIG. 17, the impeller 3 mounted on the top of shaft 49 is rotated in the counter-clockwise direction. Although the basket 2 is not driven directly by shaft 49, the water current produced by impeller 3 tends to rotate the basket counter-clockwisely, but at this time, the lower end 74 of coil spring 72 fixed to the hollow shaft 46 of basket 2 is rotated counter-clockwisely. The coil spring 72 having its upper portion in contact with the sleeve 67 is thus contracted to unite the hollow shaft 46 and sleeve 67 together for applying braking force to the shaft 46, and the basket 2 is prevented from rotation by virtue of the water current produced by the impeller 3. When the reversing cam 84A transfers from contact 84b to contact 84c to reverse the direction of rotation of motor 14, with the shaft 49 and impeller 3 rotating clockwisely, and the basket 2 tending to rotate in the same direction by virtue of the water current produced by the impeller 3, but at this time, the upper portion of coil spring 90, with its lower portion wound up against the sleeve 67 through the sleeve 70 fixed to the hollow shaft 46, is rotated clockwisely to shorten the diameter, thus uniting the sleeves 67 and 70 together to apply brake to the hollow shaft 46 for preventing rotation of basket 2 in the clockwise direction.

Thus, the machine has been prepared for the washing operation which will now be described.

In order that the impeller 3 may be disposed within the rotatable basket 2, with the impeller shaft 49 penetrating through the hollow shaft 46 of basket 2, thus forming a simple driving mechanism, the impeller 3 is naturally disposed at the bottom centre of basket 2. In this case, if the basket is of cylindrical shape as shown by 2′ in FIGS. 6 and 9, the water current produced by the impeller 3 rotating in one direction at a high speed is a simple stationary eddy of definite angular speed around the impeller, but there is no up-and-down component of the current. The wash is thus circulated in one and same horizontal path, and there is no opportunity for the upper portion of the wash to be rubbed and washed by the impeller 3. In addition, the surface of washing water assumes a paraboloid shape as shown in FIG. 9, resulting in decreased amount of water in the basket effective for washing.

In order to prevent such a simple water current from established within the basket, obstructor plates 89 upstanding in the basket 2″ may be provided as shown in FIGS. 7 and 10, but by virtue of the fact that the basket 2″ is of cylindrical form in its most portion, the disturbance of water current by plates 89 occurs merely suddenly, and in order to have the disturbance effect of plates 89 satisfactory for the purpose, the plates 89 should be made projecting remarkably towards the centre of basket 2″. Since such obstructor plates 89 are disposed perpendicular to the water current, the latter strikes the plates 89 violently to stop once thereat, and then moves in the direction opposite to the rotation of impeller, colliding with the normal water stream, thus producing small eddies about obstructor plates 89, as shown in FIG. 10. If the wash is placed in such a basket 2″, the wash is also caused to collide with the obstructor plates 89 violently, and then forced to move along with the predominant water current in the direction of rotation, resulting in damage of the wash due to the obstructing plates catching the wash and rubbing the wash strongly. In addition, when much wash is placed in the cage 2″ as is usual, the water current produced by the impeller 3 is naturally weak, and the wash that has collided with obstructor plates 89 cannot be subjected to any force strong enough to liberate the wash from the plates 89, resulting in entangling of the wash and obstruction of smooth circulation of the same, as well as local disposition of the wash after draining, which causes remarkable unbalance of the basket 2″ such that the basket 2″ would vibrate violently during the centrifugal extraction.

FIGS. 8 and 11 show the basket 2 of the present invention. The basket 2 is of substantially ellipsoidal cross-section, with the impeller 3 rotating at the bottom center of the basket. When the impeller 3 rotates at a high speed to produce water current within the basket, the speed of water current along the inner wall surface of basket 2 varies as shown by FIG. 12. Thus, the water current speed is lowered as the distance from the centre of impeller 3 is increased. As the basket wall approaches the center of impeller 3, the cross-sectional area of water current is made narrower, and as a result, the water current increases its speed thereat. At the portion of basket 2 where the current speed is low, the water level is raised, while, at the portion of basket 2 where the current speed is high, the water level is lowered, resulting in up-and-down motion of water all around in the basket 2, in a smooth manner. In addition, the speed of water current at the upper portion is naturally lower than that at the lower portion, and there takes place a sort of phase difference between the upper and lower portions of water current, resulting in the mode of water flow substantially as shown in FIG. 11, wherein water piles up strongly and remarkably from the basket bottom and then falls down, successively. If the wash is in such a water current, the wash is forced to circulate along the smooth inner surface of basket 2, accompanied by remarkable up-and-down movement in various manners, without obstruction by anything. Thus, substantially the whole wash is rubbed by the impeller 3 successively, and satisfactory washing is effected without damaging the wash.

Experiments have been accomplished for determining the most suitable parameters to define the shape of the above-mentioned ellipse of the basket cylinder. Different shapes of ellipsoidal cylinder baskets 2 as defined by eccentricity of ellipse were employed in the experimental washing operations, and the effectiveness of washing were determined. The results are shown by FIG. 13. Zero eccentricity signifies a true circle and corresponds to the circular cylinder basket 2′ as shown in FIGS. 6 and 9. If, however, the eccentricity is made too large, the flow speed curve of FIG. 12 becomes too fluctuating, with substantially no water-current speed at remote distances from the impeller 3, where the wash is left immovable, resulting in low effectiveness of washing. In addition, the wash tends to be located in a very unbalanced state after draining, leading to bad centrifugal extraction. Moreover, the basket with too great an oblong cross-sectional shape has a lowered capacity for accommodating the wash. Thus, as is obviously seen from FIG. 13, the most desirable washing effect can be obtained within the range of eccentricity of ellipse from 0.50 to 0.61. Such a range has been found independent from size of basket, shape of impeller, their rotating speed, etc.

When the washing operation has been effected for a predetermined ample period of time, the cam 79A transfers from contact 79c to 79b, but since the push button 10A is being depressed at this time to connect contact 10a to contact 10b, a circuit 86–79a–79A–79b–10–77 is established to continue the programed operation. At this time further, the cam 80 is closed, and the cam 82A transfers from contact 82c to contact 82b to deenergize the motor 14 for terminating the washing operation. Simultaneously, a circuit 86–79b–10–77–80–82a–82A–82b–18–87 is established to energize the electromagnet 18. The electromagnet 18 attracts the operating rod 19 to release the rubber member 22 for opening the drain valve 23, and at the same time, to rotate the lever 25 for disengaging the lever end 59 out of the coil case engagement piece 58, thus liberating the lower end 54 of coil spring 52 as well as the upper end 73 of coil spring 72. The coil spring 52 acts to unite together the hollow shaft 46 and the collar 51 secured to the rotating shaft, by the self-tightening force of spring 52, while the coil spring 72 expands itself to disengage from the sleeve 67 for releasing the basket 2 from braking. During the drain operation, however, no torque is applied to the basket 2, the latter is not rotated even if the brake is released. When the water level has been lowered by the draining, the pressure switch 8 is actuated to transfer the movable piece 8A from contact 8b to contact 8c, but since the cam 81 is not yet closed and the switch 80 is closed in parallel with the switch 8, the electromagnet 18 is kept energized for draining water from the tank 1.

When the draining has been completed, the cam 81A is closed to complete a circuit 86–79b–10–77–8c–81–7–87 for energizing the water supply valve 7 to commence water supply into the tank 1, and the cam 82A is opened to deenergize the electromagnet 18 and the motor 14. Subsequently, the cam 80 is opened to deenergize the timer motor 78 and there is obtained water supplying condition just as before the washing operation. Upon completion of water supply as above-mentioned, the impeller 3 is rotated for accomplishing the rinsing operation for driving remaining washing agent out of the wash, and then the water is drained out again.

After then, water is supplied again into the tank 1 for effecting the second rinsing operation, and then drained. During this latter draining operation, when water has been retained in the tank 1 in half the full amount or so, the switch 83 is closed to start the motor 14. At this time, since the clutch 13 is in the state for the draining operation, the coil spring 52 wound counter-clockwisely acts to unite together the hollow shaft 46 and the collar 51 fixed to the rotating shaft 49. The upper portion of coil spring 72 is disengaged from the sleeve 67, and the coil spring 90 is wound counter-clockwisely as the coil spring 52. Consequently, when the switch 83 is closed to rotate the motor 14 in the counter-clockwise direction, the coil spring 52 is caused to decrease its diameter to further tighten the connection of hollow shaft 46 and collar 51. Thus, the hollow shaft 46 is rotated positively in the counter-clockwise direction, with the upper portion of coil spring 90 expanded by frictional force between it and the sleeve 70 fixed to hollow shaft 46, for disconnecting the hollow shaft 46 from the brake mechanism. Any excess friction between the inner surface of coil spring 90 and the outer surface of sleeve 70 is minimized by the lubricating oil contained in the felt 24.

When water is completely drained out of the basket as shown in FIG. 14, the degree of unbalance is expressed by W.e.α, where W is the weight of the wash when dried, e is the eccentricity, and α is the percentage water content of the wash. α is dependent upon the kind of cloth, but has a value of 3 to 4, in general. Consequently, the degree of unbalance of the wet wash is 3 to 4 times that of the dry wash.

Contrary to the above, when water is retained in the basket in such an amount that the wash is wholly immersed in the water, the unbalance W.e. of the wash is substantially counter-balanced by water of the same volume as the wash positioned symmetrically with respect to the wash, as shown in FIG. 15. As a result, if the specific weight of the wash is γ, the whole unbalance may be expressed by $W.e - W/γ.e = W.e(1 - 1/γ)$. γ is dependent upon the kind of cloth, but has a value of 1.2 to 1.5, in general. Consequently, unbalance in this case is one sixth to one third of W.e, and about 1/20 to 1/10 of W.e.α in the case of FIG. 14. The basket 2 is started to rotate at such an extremely little unbalanced state, and meanwhile, water is being drained continuously through the draining hose 29. Consequently, when the basket 2 has attained to its maximum rotating speed, water within the basket might have been drained out substantially, but not effect the above-described balancing function. However, it is when the basket 2 is rotating at a low speed that the basket is caused to vibrate most violently by unbalance, and particularly when the vibrating system including the basket and others is in resonance with the number of rotation, extremely violent vibration occurs. Although variable depending upon the system of the basket and others, the resonant frequency of the same is about 2.5 to 5 c./s., while the normal number of high speed rotation of basket 2 is 8.5 to 30 c./s. Therefore, it is only required to have water kept remaining in the basket 2 at the time of the above-mentioned resonance. After then, water may be drained from the basket as the basket is accelerated further, and the draining may best be completed when the basket has attained to the normal high rotating speed. If water should remain in the basket after the latter has attained to the normal rotating speed, centrifugal extraction of the wash would undesirably be obstructed and the high speed rotation of basket 2 would be impeded.

The most suitable amount of water to be kept remaining in the basket 2 as hereinabove mentioned has been determined by experiments, the result being shown in FIG. 16. In the figure, the amount of remaining water is designated by ratio of water quantity to weight of clothes (the wash) most suitable for washing (standard weight of the wash), in order that the curve may apply to different sizes of the basket 2. As is clearly seen from the curve, when the remaining water is too little, the balancing effect of water is insufficient, resulting in large amplitude of vibration, while when the remaining water is too much, the basket is loaded high to retard the speed up of the basket, and the water tends to load on the basket very eccentrically if the tank 1 tilts in one side or the wash floats, also resulting in large amplitude of vibration. Thus, the range of most suitable amount of remaining water is substantially from 4 to 11 times the standard weight of the wash, which corresponds to about 15 to 45% of the volume of basket 2. Variations may occur, because such an amount of remaining water cannot be controlled accurately by means of the timer, but since the wash is placed in the basket 2 having many, many perforations and water is drained out of the water tank 1 without obstruction, there is no fear that the wash might obstruct the draining. Thus, the draining speed of water can be always constant substantially, so that the timer control may be effected satisfactorily.

Anti-vibration provision in the present invention will now be explained. The vibrations of basket 2 and water tank 1 during the centrifugal extraction are extremely complicated, vibrations taking place in all three dimensional directions, and such three dimensional vibration should be prevented in the respective directions. Referring to FIG. 2, any lateral vibration in left and right direction is absorbed by the spherical contact fraction between the semi-spherical washers 28, 36 and the semi-spherical pieces 29, 37, which are maintained in close contact by the weight of water tank 1, and the vibration energy is mostly dissipated as frictional heat loss. Simultaneously, the rubber pipe 42 with its upper end fixed flexes to a large extent for opposing the vibration, and absorbs some vibration energy by its internal elastic hysteresis. In addition, the suspension bar 30 acts to compress the rubber ring 34 against the semi-spherical washer 28, serving as a buffer. Thus, the framework 4 is substantially prevented from being subjected to lateral vibration.

Next, the water tank 1 may be caused to do headshaking motion with its lower end stationary, by virtue of the basket 2 therein swinging or shaking, resulting in up-and-down motion of the side wall of water tank 1. Such an oscillation is bumped by the coil spring 41 and the rubber ring 38. However, the coil spring 41 does not absorb the vibration energy substantially, but repels the vibration, and at last, the vibration of water tank 1 would be amplified to dangerous jumping motion. According to the invention, however, frictional sliding motion takes place between the cap 39 and the rubber pipe 42 moving up and down, and the vibration energy is partly converted to heat loss. In addition, the vibration is naturally accompanied by the above-mentioned lateral vibration, and the cap 39 is thereby pressed sideway strongly to increase the frictional loss. When the above-described anti-vibration force should not be sufficient to fully suppress vibration that is too large, the water tank 1 would vibrate to a large extent, and the safety switch 77 mounted on the framework 4 would be opened to stop the operation of washing machine.

When the wash has been extracted sufficiently, the switch 83 opens to deenergize the main motor 14 for stopping the rotation of shaft 46, and then the switch 82 opens to deenergize the electromagnet 18, the clutch mechanism assuming the state shown in FIG. 20. Thus, the lever end 59 is caused to engage the engagement piece 58 of coil case 55. When the coil case 55 is braked, the lower end 54 of coil spring 52, with its upper end anchored to the hollow shaft 46 rotating in the counter-clockwise direction, is turned relatively clockwise direction to expand the lower portion of coil spring 52 for releasing the collar 51, whereby the rotating shaft 49 is disconnected from the hollow shaft 46. At the same time, the upper end 73 of coil spring 72, with its lower end 74 fixed to the sleeve 71 secured to the hollow shaft 46 which is rotating in the counter-clockwise direction, comes to stop, and it is caused to rotate relatively clockwisely to contract its inner diameter. Since the upper portion of coil spring 72 is wound upon the sleeve 67 secured to the disc 64, and its lower end 74 is turned counter-clockwisely by the hollow shaft 46, the coil spring 72 is further elongated to contract its inner diameter for positively uniting together the sleeves 67 and 71. Thus, the brake disc 64 and hollow shaft 46 are united together to promptly stop the basket 2. At this time, the coil spring 90 is in inoperative condition, because its inner diameter is expanded by frictional contact with the sleeve 70, as when the basket 2 is rotating.

The first centrifugal extraction is terminated by the stopping of rotation of basket 2. After then, clean water is supplied into the water tank 1 just as in the case of aforementioned washing and rinsing operations, and the impeller 3 is rotated to effect the final and superior rinsing. Thus, any remaining dust and washing agent are driven out substantially completely out of the clothes. Draining is then effected just as in the hereinabove-mentioned manner, leaving water at the predetermined level, and the centrifugal extraction is started. When the basket 2 has attained to its normal high speed of rotation, water therein has almost completely been drained, and then the extraction is effected at a stable high speed state for a suitable period of time. When the wash has been to a satisfactory degree, brake is applied to the basket 2 to stop the latter in the manner as described hereinabove, and the whole washing program has completely been accomplished. At this time, the cam 79A driven by timer motor 78 comes to the position at which it does not engage any of contacts 79b and 79c, thus opening the main switch 79, and the pilot lamp 9, water supply valve 7, main motor 14, electromagnet 18, and timer motor 78 are all deenergized.

The wash may be classified according to natures of clothes into several groups, and each group may be subjected to nonautomatic operation of the washing machine. In this case, the push button 10A is not depressed, with the automatic-nonautomatic switch 10 kept open. When the washing operation has been finished, the cam 79A transfers from contact 79c to contact 79b, with the switch 10 open, the washing machine comes to stop. The wash, the first group of clothes, is then taken out of the basket 2, and the second group of clothes is placed in the basket for effecting the washing operation again, with supplement of water taken out of the tank 1 along with the first group of clothes. When all the groups of clothes have been thus washed, all of them may be placed in the basket 2, and the push button 10A may be depressed for accomplishing the automatic rinsing and centrifugal extraction program.

It is to be noted that many changes and modifications are possible in the above-described embodiment of the present invention, within the scope and spirits of the appended claims.

What we claim is:

1. A washing machine comprising a water tank arranged in a framework, a basket vertically disposed in said water tank and rotatable therein, said basket being of substantially ellipsoidal cylinder configuration, an impeller disposed at the bottom center of said basket, a hollow shaft depending from the center of bottom wall of said basket, a rotating shaft of high speed rotation passing through said hollow shaft, the upper end of said rotating shaft being fixed to said impeller, means for connecting and disconnecting said hollow shaft to and from said rotating shaft, means for applying and releasing a braking force to and from said hollow shaft, and means for supporting said water tank resiliently in said framework and for converting at least a portion of the vibration energy of said water tank into frictional heat.

2. The washing machine according to claim 1, in which said ellipsoidal cylinder basket has a cross-sectional shape similar to an ellipse having eccentricity falling in the range from 0.50 to 0.61.

3. The washing machine according to claim 1, additionally comprising means for keeping a quantity of water remained in said basket at the time when said basket is started to rotate for centrifugal extraction of the wash, said quantity of water being 15 to 45% by volume of said basket.

4. The washing machine according to claim 1, additionally comprising means for draining water from said water tank, and means for starting said basket to rotate during the draining just before the centrifugal extraction of said machine at such a time that water remains in said basket in a quantity of 15 to 45% by volume of said basket.

5. The washing machine according to claim 1, in which said last-mentioned means comprises resilient support members and means for providing spherical friction contact faces with said resilient members, all disposed between said water tank and said framework.

6. The washing machine according to claim 1, said last-mentioned means comprising resilient support members between said water tank and said framework, means for effecting frictional sliding motion in up-and-down direction, and means arranged in series relation with said support members and said means for effecting frictional sliding motion, for providing spherical frictional contacts between them.

7. The washing machine according to claim 1, in which said last-mentioned means comprises, between said water and said framework, a spherically faced washer, a spherically faced piece in frictional contact with said washer, a suspension bar passing through said washer and said spherically faced piece, a compressed coil spring arranged in series relation with said spherically face contacting washer and piece, a resilient pipe surrounding said coil spring, and a slider secured to said suspension bar and disposed in opposition to the inner surface of said resilient pipe.

8. The washing machine according to claim 1, in which said means for applying and releasing a braking force comprises a member continuously subjected to a braking force by a stationary element, and means for connecting and disconnecting said hollow shaft to and from said member.

9. The washing machine according to claim 1, in which said means for applying and releasing a braking force comprises a member continuously subjected to a braking force by a stationary element, a coil spring having one end secured to one of said member and said hollow shaft and encircling both of said member and said hollow shaft, and means for tightening and releasing the other end of said coil spring.

10. A washing machine comprising a water tank arranged in a framework, a basket vertically disposed in said water tank and rotatable therein, said basket being of substantially ellipsoidal cylinder configuration, an impeller disposed at the bottom center of said basket, a hollow shaft depending from the center of bottom wall of said basket, a rotating shaft passing through said hollow shaft, the upper end of said rotating shaft being fixed to said impeller, means for rotating said rotating shaft at a high speed and for reversing the direction of rotation of the same, means for supporting said water tank resiliently in said framework and for converting at least a portion of the vibration energy of said water tank into frictional heat, means for connecting and disconnecting said hollow shaft to and from said rotating shaft, a brake member continuously subjected to a braking force by a stationary element, a coil spring wound around said brake member and said hollow shaft, means for expanding and contracting one end of said coil spring, and a second coil spring, said first-mentioned coil spring being normally in contracted state to contact said brake member and said hollow shaft, but when said hollow shaft is rotated in such a direction that said first-mentioned coil spring is expanded, said second coil spring being contracted by means of said hollow shaft by virtue of the fact that said second coil spring is wound tight around said brake member and said hollow shaft by its own winding force.

11. A washing machine comprising a water tank arranged in a framework, a basket vertically disposed in said water tank and rotatable therein, said basket being of substantially ellipsoidal cylinder configuration, an impeller disposed at the bottom center of said basket, a hollow shaft depending from the center of bottom wall of said basket, a rotating shaft passing through said hollow shaft, the upper end of said rotating shaft being fixed to said impeller, means for rotating said rotating shaft at a high speed and for reversing the direction of rotation of the same, means for supporting said water tank resiliently in said framework and for converting at least a portion of the vibration energy of said water tank into frictional heat, a coil spring wound around said rotating shaft and said hollow shaft in contact therewith to connect them together, means for expanding and contracting one end of said coil spring, a brake member continuously subjected to a braking force by a stationary element, a second coil spring wound around said brake member and said hollow shaft, and means for expanding and contracting one end of said second coil spring.

12. A washing machine comprising a water tank arranged in a framework, a basket vertically disposed in said water tank and rotatable therein, said basket being of substantially ellipsoidal cylinder configuration, an impeller disposed at the bottom center of said basket, a hollow shaft depending from the center of bottom wall of said basket, a rotating shaft passing through said hollow shaft, the upper end of said rotating shaft being fixed to said impeller means for rotating said rotating shaft at a high speed and for reversing the direction of rotation of the same, means for supporting said water tank resiliently in said framework and for converting at least a portion of the vibration energy of said water tank into frictional heat, a first coil spring wound around said rotating shaft and said hollow shaft in contact therewith to connect them together, a member continuously subjected to a braking force by a stationary element, a second coil spring wound around said member and said hollow shaft, and means for contracting one end of said second coil spring when expanding one end of said first coil spring, and for expanding said one end of said second coil spring when contracting said one end of said first coil spring.

13. A washing machine comprising a water tank arranged in a framework, a basket vertically disposed in said water tank and rotatable therein, said basket being of substantially ellipsoidal cylinder configuration, an impeller disposed at the bottom center of said basket, a hollow shaft depending from the center of bottom wall of said basket, a rotating shaft passing through said hollow shaft, the upper end of said rotating shaft being fixed to said impeller means for rotating said rotating shaft at a high speed and for reversing the direction of rotation of the same, means for supporting said water tank resiliently in said framework and for converting at least a portion of the vibration energy of said water tank into frictional heat, means for connecting and disconnecting said hollow shaft to and from said rotating shaft, a brake element fixed to said water tank, a member continuously subjected to a braking force by said brake element, a sleeve integral with said member and rotatable about said hollow shaft, a coil spring wound around said hollow shaft and the lower portion of said sleeve, a second coil spring wound around said hollow shaft and the upper portion of said sleeve in the same direction as said first-mentioned coil spring, and means for expanding and contracting one end of either one of said two coil springs.

14. A washing machine comprising a water tank arranged in a framework, a basket vertically disposed in said water tank and rotatable therein, said basket being of substantially ellipsoidal cylinder configuration, an impeller disposed at the bottom center of said basket, a hollow shaft depending from the center of bottom wall of said basket, a rotating shaft passing through said hollow shaft, the upper end of said rotating shaft being fixed to said impeller, means for rotating said rotating shaft at a high speed and for reversing the direction of rotation of the same, means for supporting said water tank resiliently in said framework and for converting at least a portion of the vibration energy of said water tank into frictional heat, a first coil spring wound around said rotating shaft and the lower portion of said hollow shaft, a brake element secured to said water tank, a member continuously subjected to a braking force by said brake element, a sleeve integral with said member and rotatable about said hollow shaft, a second coil spring wound around the lower portion of said sleeve and said hollow shaft, a connector member rotatable about said hollow shaft, means for stopping or releasing said connector element, means for fixing one end of said first coil spring to said connector member, and means for releasing or stopping said connector member, whereby the diameter of said second coil spring is contracted when the diameter of one end of said first coil spring is expanded, while the diameter of said second coil spring is expanded when the diameter of one end of said first coil spring is contracted by virtue of the fact that one end of said second coil spring is fixed to said connector member.

15. A washing machine comprising a water tank arranged in a framework, a basket vertically disposed in said water tank and rotatable therein, said basket being of substantially ellipsoidal cylinder configuration, an impeller disposed at the bottom center of said basket, a hollow shaft depending from the center of bottom wall of said basket, a rotating shaft passing through said hollow shaft, the upper end of said rotating shaft being fixed to said impeller, means for rotating said rotating shaft at a high speed and for reversing the direction of rotation of the same, means for supporting said water tank resiliently in said framework and for converting at least a portion of the vibration energy of said water tank into frictional heat, a coil case rotatable about said hollow shaft, a lever for stopping or releasing said coil case, a first coil spring wound around said rotating shaft at the lower portion, with the lower end fixed to said coil case, and the upper end secured to said hollow shaft, two stationary discs non-rotatably secured to said water tank, a rotatable disc continuously sandwiched between said two stationary discs, a sleeve integral with said rotatable disc and rotatable about said hollow shaft, a second coil spring having its upper portion wound around the lower portion of said sleeve with a gap therebetween, its mid point fixed to said coil case, and its lower end fixed to said hollow shaft, and a third coil spring having its lower portion wound around said sleeve and its upper portion wound around said hollow shaft engaging with them by its own elastic winding force.

16. A washing machine comprising a framework, a water tank disposed in said framework, a basket vertically disposed in said water tank and rotatable therein, said basket being of substantially ellipsoidal cylinder configuration, an impeller disposed at the bottom center of said basket, a hollow shaft depending from the center of bottom wall of said basket, a rotating shaft passing through said hollow shaft, the upper end of said rotating shaft being fixed to said impeller, an electric motor for rotating said rotating shaft at a high speed, means for supporting said water tank resiliently in said framework and for converting at least a portion of the oscillation energy of said water tank into frictional heat, means for connecting and disconnecting said hollow shaft to and from said rotating shaft and for applying a braking force to said hollow shaft when said connection is released, an electromagnet for controlling said last-mentioned means, a change-over switch for energizing said electromagnet or said motor optionally, and a timer motor for operating said switch.

17. A washing machine comprising a framework, a water tank disposed in said framework, a basket vertically disposed in said water tank and rotatable therein, said basket being of substantially ellipsoidal cylinder configuration, an impeller disposed at the bottom center of said basket, a hollow shaft depending from the center of bottom wall of said basket, a rotating shaft passing through said hollow shaft, the upper end of said rotating shaft being fixed to said impeller, an electric motor for rotating said rotating shaft at a high speed, means for supporting said water tank resiliently in said framework and for converting at least a portion of the oscillation energy of said water tank into frictional heat, a draining hose extending from the bottom of said water tank to outside said framework, a drain valve formed in said draining hose, an operating rod for said drain valve, a clutch mechanism for effecting connection and disconnection between said rotating shaft and said hollow shaft and for applying a braking force to said hollow shaft in opposite relation with said connection and disconnection, and an electromagnet for operating said operating rod and said clutch mechanism simultaneously for releasing the connection between said rotating shaft and said hollow shaft when said drain valve is to be opened and to effect the braking, while, when said drain valve is closed, for connecting said hollow shaft to said rotating shaft without effecting the braking.

18. A washing machine comprising a framework, a water tank disposed in said framework, a basket vertically disposed in said water tank and rotatable therein, said basket being of substantially ellipsoidal cylinder configuration, an impeller disposed at the bottom center of said basket, a hollow shaft depending from the center of bottom wall of said basket, a rotating shaft passing through said hollow shaft, the upper end of said rotating shaft being fixed to said impeller, an electric motor for rotating said rotating shaft at a high speed, means for supporting said water tank resiliently in said framework and for converting at least a portion of the oscillation energy of said water tank into frictional heat, a first coil spring wound around said rotating shaft and said hollow shaft, a sleeve continuously subjected to a braking force from a stationary member, a second coil spring wound around said hollow shaft and said sleeve, a lever to which said two coil springs are fixed at respective one ends so as to give them expanding and contracting forces in opposite relations, a draining hose extending from the bottom of said water tank to outside said framework and having midway a resilient rubber portion, a supporter plate placed back to said rubber portion, a press member for pressing and releasing said rubber portion against and from said supporter plate, and an electromagnet for simultaneously operating said lever and said press member to expand the diameter of said first coil spring when said rubber portion is pressed against said supporter plate, and to contract the diameter of said first coil spring when said rubber portion is released.

19. A washing machine comprising a framework, a water tank disposed in said framework, a basket vertically disposed in said water tank and rotatable therein, said basket being of substantially ellipsoidal cylinder configuration, an impeller disposed at the bottom center of said basket, a hollow shaft depending from the center of bottom wall of said basket, a rotating shaft passing through said hollow shaft, the upper end of said rotating shaft being fixed to said impeller, an electric motor for rotating said rotating shaft at a high speed, means for supporting said water tank resiliently in said framework and for converting at least a portion of the oscillation energy of said water tank into frictional heat, a first coil spring wound around said rotating shaft and said hollow shaft, a sleeve continuously subjected to a braking force from a stationary member, a second coil spring wound around said hollow shaft and said sleeve, a lever to which are fixed one ends of said two coil springs, respectively, so that expanding and contracting forces are applied to said two coil springs in opposite relations, a draining hose extending from the bottom of said water tank to outside said framework and having midway a resilient rubber portion, a supporter plate placed back to said rubber portion, a press member for pressing and releasing said rubber portion against and from said supporter plate, an electromagnet for simultaneously operating said lever and said press member to expand the diameter of said first coil spring when said rubber portion is pressed against said supporter plate, and to contract the diameter of said first coil spring when said rubber portion is released, and a change-over switch for energizing said electromagnet or said electric motor optionally.

20. A washing machine comprising a framework, a water tank disposed in said framework, a basket vertically disposed in said water tank and rotatable therein, said basket being of substantially ellipsoidal cylinder configuration, an impeller disposed at the bottom center of said basket, a hollow shaft depending from the center of bottom wall of said basket, a rotating shaft passing through said hollow shaft, the upper end of said rotating shaft being fixed to said impeller, an electric motor for rotating said rotating shaft at a high speed, means for supporting said water tank resiliently in said framework and for converting at least a portion of the oscillation energy of said water tank into frictional heat, a clutch mechanism for connecting and disconnecting said hollow shaft to and from said rotating shaft, another clutch mechanism for applying and releasing a braking force to and from said hollow shaft, a lever for operating said two clutch mechanisms in opposite senses, a draining hose extending from the bottom of said water tank to outside said framework, a drain valve provided midway of said draining hose, an electromagnet for operating said lever and said drain valve conjointly so that said hollow shaft is disconnected from said rotating shaft when said drain valve is opened, while, when said drain valve is closed, said hollow shaft is connected to said rotating shaft, a cam switch for selectively energizing said electromagnet and said electric motor, a timer motor for driving a cam group including said cam switch for controlling said electromagnet and said electric motor, a switch responsive to the hydraulic pressure in said water tank for controlling the load together with said cam group, a cam driven by said timer motor and arranged in series with said timer motor for opening after the washing operation has been terminated, a manual push button switch in parallel with said last-mentioned cam and in series with said timer motor.

References Cited by the Examiner
UNITED STATES PATENTS
| | | | |
|---|---|---|---|
| 2,836,301 | 5/1958 | Bruckman | 68—23 X |
| 2,972,510 | 2/1961 | Buss et al. | 68—24 X |
| 3,021,956 | 2/1962 | Bochan | 68—23 X |
| 3,090,472 | 5/1963 | Morrison | 68—23 X |
| 3,111,017 | 11/1963 | Searle | 68—24 X |
| 3,129,574 | 4/1964 | Wolverton | 68—24 |

FOREIGN PATENTS
| | | |
|---|---|---|
| 518,868 | 11/1955 | Canada. |
| 1,113,123 | 11/1955 | France. |
| 1,126,053 | 7/1956 | France. |

WILLIAM I. PRICE, *Primary Examiner.*